United States Patent [19]
Lindahl et al.

[11] 3,943,673
[45] Mar. 16, 1976

[54] CELLULAR FLOOR, WALL OR THE LIKE STRUCTURE

[75] Inventors: Harold T. Lindahl, San Francisco, Calif.; Theodore Maggos, New York, N.Y.

[73] Assignees: IS Incorporated Systems Company, New York, N.Y.; Gershon Meckler, Bethesda, Md.; part interest to each

[22] Filed: Sept. 30, 1974

[21] Appl. No.: 510,552

Related U.S. Application Data

[63] Continuation of Ser. No. 404,005, Oct. 5, 1973, abandoned.

[52] U.S. Cl. .................... 52/98; 52/220; 174/65 R; 174/96; 174/98
[51] Int. Cl.² ................................................ E04B 5/48
[58] Field of Search ............... 52/220, 221, 98–100; 174/65 R, 49, 96, 98; 165/49

[56]  References Cited
UNITED STATES PATENTS

| | | | |
|---|---|---|---|
| 1,776,656 | 9/1930 | Frederickson | 52/221 |
| 1,996,371 | 4/1935 | Fullman | 52/221 |
| 2,202,147 | 5/1940 | Gerriets | 52/220 |
| 2,207,301 | 4/1940 | Robinson | 52/221 |
| 2,297,179 | 9/1942 | Walker | 52/221 |
| 2,813,375 | 11/1957 | Lippman | 52/616 |
| 2,975,559 | 3/1961 | Hedgren | 52/221 |
| 3,093,933 | 6/1963 | Slingluff | 52/221 |
| 3,166,631 | 1/1965 | Reiland | 52/221 |
| 3,176,053 | 3/1965 | DeStasio | 52/221 |
| 3,356,134 | 12/1967 | Sawyer | 165/49 |

FOREIGN PATENTS OR APPLICATIONS

| | | | |
|---|---|---|---|
| 1,459,913 | 11/1968 | Germany | 52/100 |

*Primary Examiner*—Ernest R. Purser
*Assistant Examiner*—Henry Raduazo
*Attorney, Agent, or Firm*—John C. Purdue

[57] ABSTRACT

An improved cellular floor, wall or the like structure is disclosed. The structure in a specific embodiment disclosed, includes a covered raceway for electrical conductors. The raceway has a plurality of knockouts in its cover, and is covered by and at least partially supports a poured concrete floor. The improvement is a plurality of cooperating piston-cylinder assemblies on the raceway cover. Each of the assemblies is a cylinder with a concrete piston therewithin. The cylinder is positioned so that its projection on the raceway cover is larger than and covers one of the knockouts. The piston is capable of limited axial movement within the cylinder, and has an end in substantial contact with one of the knockouts. The piston end is of such size and shape that, when driven toward the knockout, the piston will drive the knockout into the raceway and enter the knockout opening. The piston expands in cross-sectional size away from the end to a size sufficiently large to prevent the piston from going completely through the knockout opening. The piston is a part of and integral with the concrete floor of the structure.

2 Claims, 3 Drawing Figures

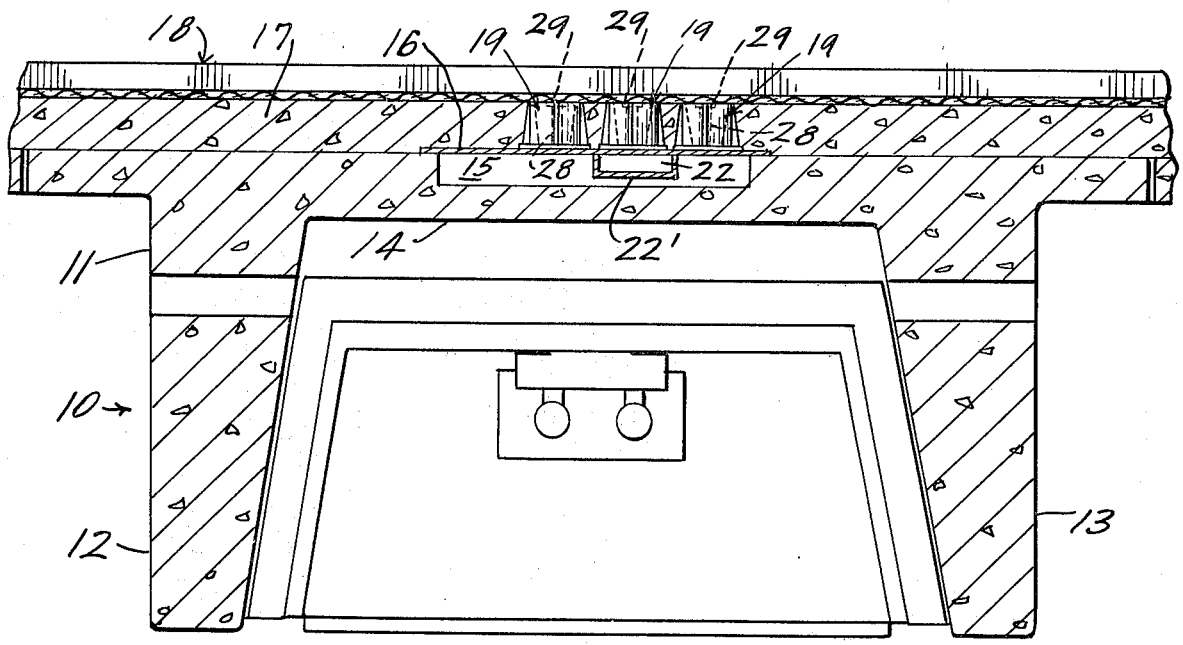
FIG-1-
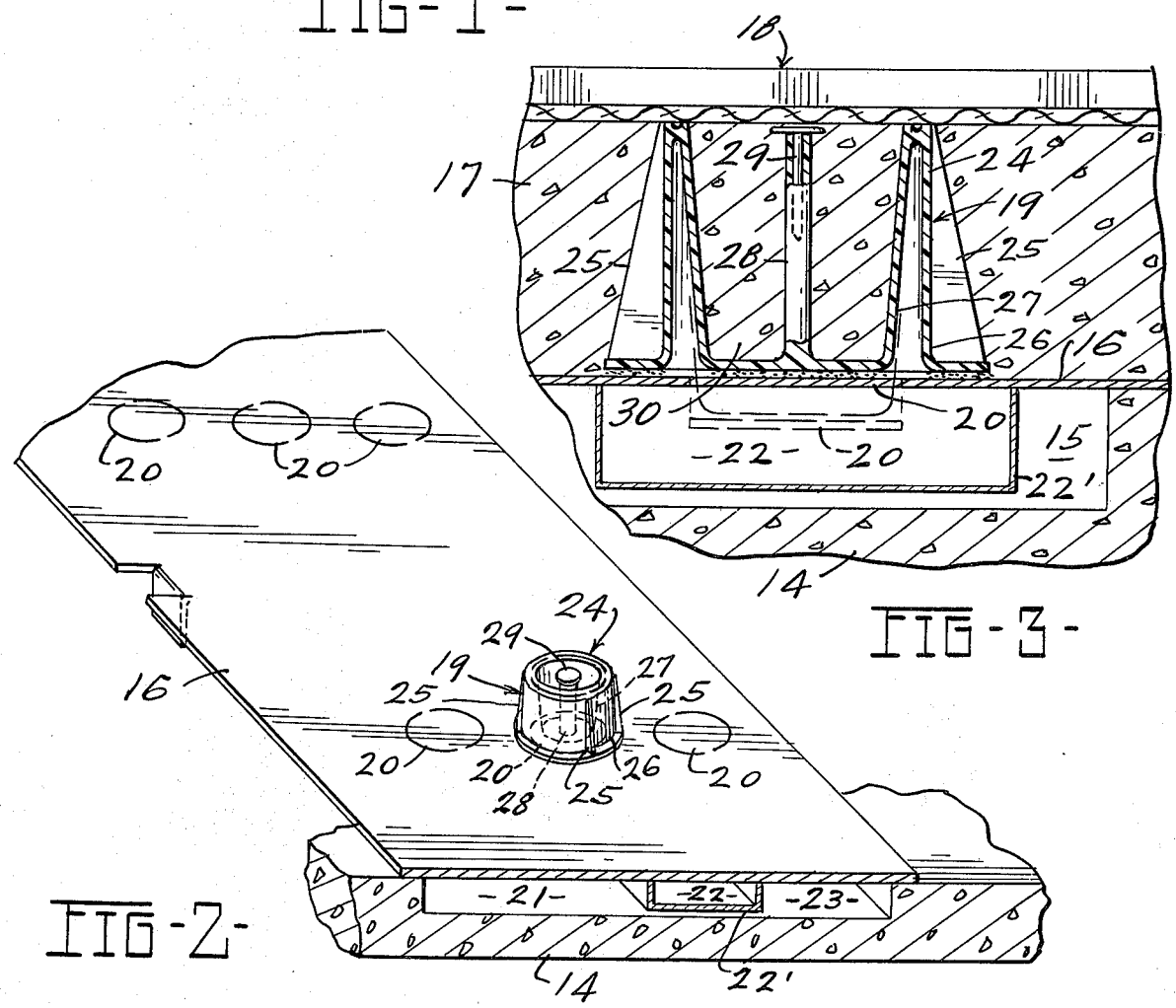
FIG-3-
FIG-2-

CELLULAR FLOOR, WALL OR THE LIKE STRUCTURE

This is a continuation of application Ser. No. 404,005, filed Oct. 5, 1973, now abandoned.

BACKGROUND OF THE INVENTION

Various cellular floor structures have heretofore been suggested*. Such structures include raceways in which electrical conductors can be positioned, as well as cells through which conditioned air and return air can be circulated as part of an air conditioning system. So far as is known, there is not presently a satisfactory economic way of providing easy access to electrical conductors in such a cellular floor after a building has been completed. In the finished building, the cellular floor itself is covered by concrete, which serves as a rough floor, and as a base for carpet or the like. Accordingly, when it has become necessary to provide a service which requires an electrical conductor at a point in the finished building where the conductor had not originally been made available, it has been common practice to remove the carpet or the like, and to drill away enough of the floor that a worker can find the cell containing the conductor required. After the service has been established, it is then necessary to repair the floor by pouring fresh concrete, as required. The expense involved militates against providing access to the conductors at every conceivable point, say, every 5 feet each way, where service might be required during the life of the building.

*See, for example, U.S. Pat. No. 3,148,727 and cited references.

BRIEF DESCRIPTION OF THE INVENTION

The present invention is based upon the discovery of an inexpensive cylinder-piston assembly which enables access to electrical conductors within a cellular floor without the necessity for damaging the concrete over the raceway to such an extent that repair is necessary. The assembly according to the invention can also be a part of a wall or the like.

BRIEF DESCRIPTION OF THE DRAWINGS

FIG. 1 is a vertical sectional view of a cellular floor structure including a raceway for electrical conductors and cooperating cylinder-piston assemblies to provide ready access to the raceway.

FIG. 2 is a fragmentary view in perspective showing the raceway of FIG. 1 with a cylinder-piston assembly adhered thereto, and illustrating one step in the production of the floor structure of FIG. 1.

FIG. 3 is a vertical sectional view showing, to a larger scale, the piston-cylinder assemblies of FIG. 1.

DETAILED DESCRIPTION OF THE INVENTION

An improved cellular floor structure according to the invention is indicated generally at 10 in FIG. 1. The structure 10 is supported on a concrete beam 11 which, in the structure shown, is a double tee with dependent legs 12 and 13 and a web 14 extending between the legs. In the upper surface of the web 14 there is a channel 15 constituting a raceway with a cover 16. There is a poured concrete floor 17 over the web 14 of the beam 11, and also over the cover 16 for the raceway 15. A carpet 18 is shown above the poured concrete floor 17. Cooperating piston-cylinder assemblies 19 are also a part of the structure 10.

Referring to FIG. 2, it will be seen that the cooperating piston-cylinder assemblies 19 are positioned over knock-outs 20 in the raceway cover 16 and, in the specific structure shown, that there are three side-by-side knockouts 20, one providing access to a raceway 21, a second providing access to a raceway 22, and a third providing access to a raceway 23. The bottom and one side of each of the raceways 21 and 23 are merely surfaces of the recess in the beam 11, while the raceway 22 is bounded on three sides by a channel 22' and on the fourth side by the cover 16. The raceway 22 can be used to furnish power for electrical service throughout the building, since it is completely enclosed within metal, in accordance with code requirements in some localities.

In producing a floor structure according to the invention, cooperating piston-cylinder assemblies 19 are merely placed over knockouts, for example the knockouts 20 in the structure of FIG. 2. Advantageously, the assemblies 19 are adhesively affixed, for example to the cover 16 over the knockouts 20. The assemblies 19 comprise an outer cylinder 24 which should have a projection on the cover plate 16 which completely covers one of the knockouts 20. The cylinder 24 has exterior reinforcing ribs 25 extending outwardly from a sidewall 26 which extends substantially at right angles to the cover plate 16 when the assembly 19 is mounted thereon.

Referring to FIG. 3, the assembly 19 includes, interiorly of the cylinder 24, a cup member 27 with a central stem 28. The cup member 27 has generally the same cross-sectional configuration as does the cylinder 24, except that the cup 27 tapers somewhat from its upper portion to its bottom. A nail 29 is embedded in the post 28, near the upper end thereof.

In producing a structure according to the invention, after the assemblies 19 have been positioned over the knockouts, as described, concrete is merely poured in the usual way to produce the floor 17. Because the tops of the assemblies 19 are open, concrete fills the cups 27 during the pouring of the floor 17. As a consequence, after setting of the concrete, there is a concrete piston 30 inside each of the assemblies 19, and this piston 30 is positioned immediately above one of the knockouts 20.

When it is desired to gain access to one of the raceways 21, 22 and 23 (FIG. 2) it is necessary only to locate one of the piston-cylinder assemblies 19 in the vicinity of the desired location. This can be done using a small magnet as a sensor for the nail 29 (FIG. 3). When the assembly 19 to be used has been located, the concrete of the floor 17 immediately thereabove can be struck a sharp blow with a hammer to drive the concrete piston 30 downwardly, thereby driving out the knockout 20 therebelow; downward movement of the concrete piston 30 is limited by its taper, downward movement thereof ceasing as soon as the side walls thereof are engaged by the opening just vacated by the knockout. As shown, the taper should be such that the concrete piston 30 stops well before it is moved far enough to cause any damage to electrical conductors in the associated raceway. Obviously the piston portion of the assembly 19 is then removed to gain access to the raceway through the displaced knockout.

It will be appreciated that the structure according to the invention, specifically disclosed in the drawings as a cellular floor structure, also is useful in many instances as a wall structure, as a ceiling structure, or the like.

For example, cooperating piston-cylinder assemblies 19 (FIGS. 1–3) can be incorporated in a wall structure or a ceiling structure to enable future location and to provide access to electrical conductors, water pipes, heating, ventilating and air-conditioning ducts, or the like, embedded therein. It will be appreciated that, in such cases, the pistons 30 may be of plaster or the like rather than of a conventional concrete composition.

What we claim is:

1. In a floor or the like structure including a covered raceway having a plurality of knockouts in its cover, and a monolithic floor or the like covering, and at least partially supported by the raceway, the improvement of cooperatiing piston-cylinder assemblies on the raceway cover, each of said assemblies comprising an outer cylinder and a filler element defining a piston therewith, overlying one of the knockouts, said piston being of such size and shape to be capable of limited axial movement within said cylinder, said piston having an end in substantial contact with one of the knockouts, said piston end being of lesser diameter than that of said cylinder end and said knockout whereby, upon limited axial movement in the direction of the raceway, said piston will drive the knockout into the raceway and enter the opening formerly occupied by the knockout, said piston expanding in cross-sectional size away from said end to a size too large to enter the knockout opening, and said piston comprising a planar section of the floor or the like of said structure.

2. In a floor or the like structure, the improvement claimed in claim 1 which additionally includes a magnetic body embedded in the floor or the like, generally centered within each of said pistons, and near the surface of the floor or the like.

* * * * *